(12) United States Patent
Nielsen

(10) Patent No.: US 9,541,662 B2
(45) Date of Patent: Jan. 10, 2017

(54) SENSOR TOWING BY MARINE VESSELS

(71) Applicant: PGS Geophysical AS, Oslo (NO)

(72) Inventor: Einar Nielsen, Bekkestua (NO)

(73) Assignee: PGS Geophysical AS, Oslo (NO)

( * ) Notice: Subject to any disclaimer, the term of this patent is extended or adjusted under 35 U.S.C. 154(b) by 118 days.

(21) Appl. No.: 14/597,545

(22) Filed: Jan. 15, 2015

(65) Prior Publication Data

US 2016/0103236 A1    Apr. 14, 2016

Related U.S. Application Data

(60) Provisional application No. 62/062,196, filed on Oct. 10, 2014.

(51) Int. Cl.
*G01V 1/38* (2006.01)
*G01V 1/22* (2006.01)

(52) U.S. Cl.
CPC ............ *G01V 1/3808* (2013.01); *G01V 1/22* (2013.01); *G01V 1/3817* (2013.01); *G01V 1/3826* (2013.01)

(58) Field of Classification Search
CPC .. G01V 1/3808; G01V 1/3817; G01V 1/3826; G01V 1/22
See application file for complete search history.

(56) References Cited

U.S. PATENT DOCUMENTS

| | | | |
|---|---|---|---|
| 3,906,352 A | 9/1975 | Parker | |
| 5,913,280 A * | 6/1999 | Nielsen | G01V 1/3826 114/242 |
| 6,267,070 B1 * | 7/2001 | Russell | B63B 21/66 114/244 |
| 9,128,208 B2 * | 9/2015 | Vahida | G01V 1/3817 |
| 2011/0158044 A1 | 6/2011 | Moldoveanu et al. | |
| 2011/0199857 A1 * | 8/2011 | Garden | G01V 1/3808 367/20 |
| 2013/0208564 A1 * | 8/2013 | Ni | G01V 1/3826 367/16 |

OTHER PUBLICATIONS

PCT Search Report, application No. PCT/EP2015/072604, mailed Dec. 16, 2015.
Carmer, John E. et al., "An Innovative Split-Spread Marine 3-D Acquisition Design for Subsalt Imaging SA3.3", Jan. 1, 1995, Retrieved from the Internet: URL:http://library.seg.org/doi/pdf/10.1190/1.1887431, pp. 991-994.

* cited by examiner

*Primary Examiner* — Krystine Breier

(57) ABSTRACT

A system. At least some illustrative embodiments are a system including a first survey vessel and a first tow line coupled to the first survey vessel. A first sensor streamer is coupled to the first tow line. Also includes are a second survey vessel and a second tow line coupled to the second survey vessel. A second sensor streamer is coupled to the second tow line and a pulling line is connected between the first tow line and the second tow line.

19 Claims, 4 Drawing Sheets

SENSOR TOWING BY MARINE VESSELS

CROSS-REFERENCE TO RELATED APPLICATIONS

This application claims the benefit of U.S. Provisional Application Ser. No. 62/062,196 filed Oct. 10, 2014 and titled "Sensor Towing by Marine Vessels". The provisional application is incorporated by reference herein as if reproduced in full below.

BACKGROUND

Geophysical surveying (e.g., seismic, electromagnetic) is a technique where two- or three-dimensional "pictures" of the state of an underground formation are taken. Geophysical surveying takes place not only on land, but also in marine environments (e.g., ocean, large lakes). Marine geophysical survey systems can use a plurality of sensor streamers (long cables), which contain one or more sensors to detect energy emitted by one or more sources and returned from the sea floor and geophysical formations below the sea floor. In a marine geophysical survey, the plurality of sensor streamers is towed behind a single survey vessel, which constrains the number of sensor streamers that may be included in the plurality or the width of a spread spanned by the plurality of sensor streamers.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Cable" shall mean a flexible load carrying member that also comprises electrical conductors and/or optical conductors for carrying electrical power and/or signals between components.

"Rope" shall mean a flexible, load carrying member that does not include electrical and/or optical conductors. Such a rope may be made from fiber, steel, other high strength material, chain, or combinations of such materials.

"Line" shall mean either a rope or a cable.

"Release device" shall mean a device configured to connect portions of a line and configured to part or separate when actuated.

"Acoustic release device" shall mean a release device that is actuated by an acoustic signal.

"Survey vessel" shall mean a ship having an on-board propulsion system and a length of fifty feet or greater.

"Exemplary, as used herein, means "serving as an example, instance, or illustration." An embodiment described herein as "exemplary" is not necessarily to be construed as preferred or advantageous over other embodiments.

DETAILED DESCRIPTION

The following discussion is directed to various embodiments of the invention. Although one or more of these embodiments may be preferred, the embodiments disclosed should not be interpreted, or otherwise used, as limiting the scope of the disclosure or the claims. In addition, one skilled in the art will understand that the following description has broad application, and the discussion of any embodiment is meant only to be exemplary of that embodiment, and not intended to intimate that the scope of the disclosure or the claims is limited to that embodiment.

Figure 1:
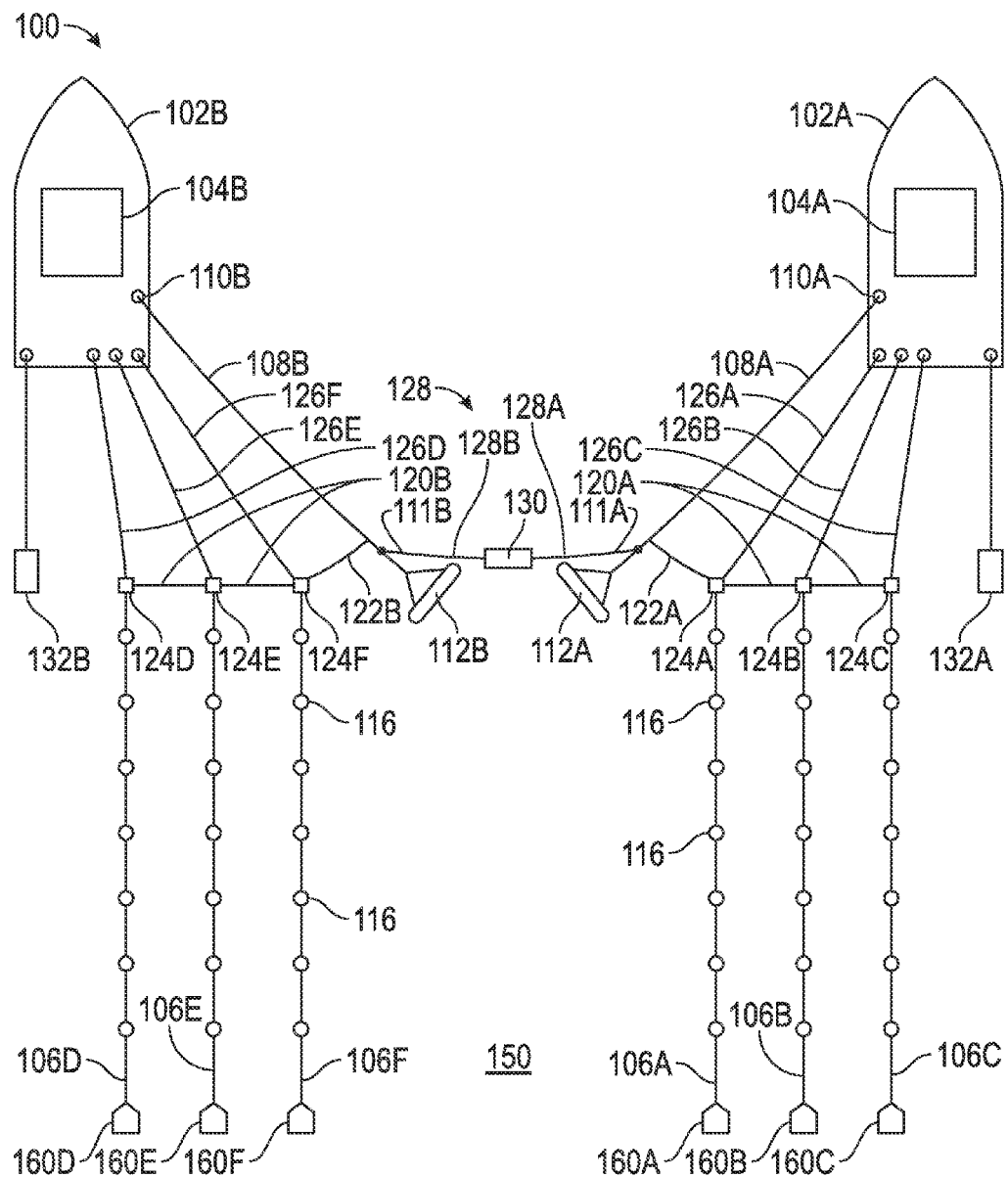
FIG. 1 shows an overhead view of a marine survey system in accordance with at least some embodiments.
Figure 1A:
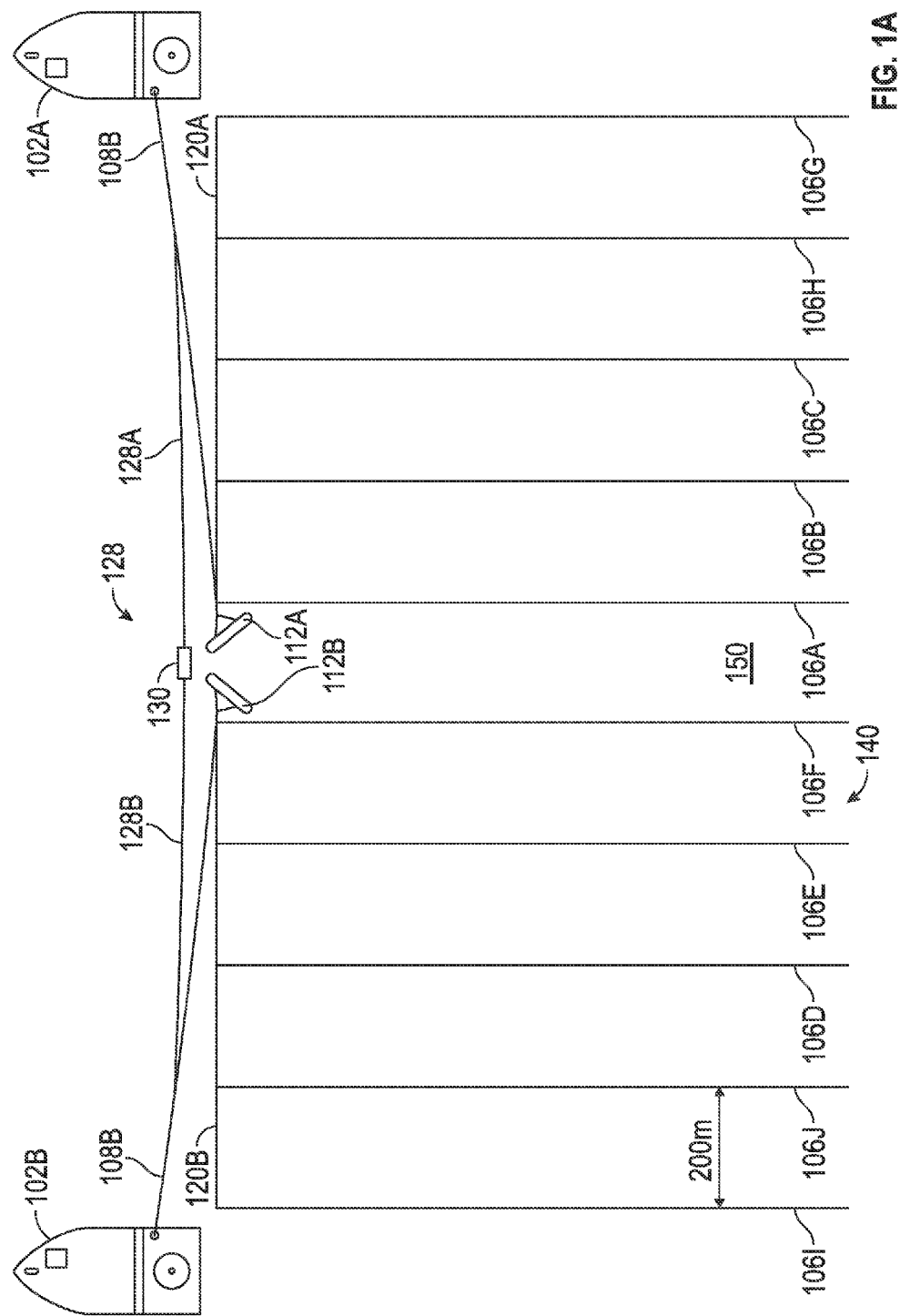
FIG. 1A shows an overhead view of a marine survey system in accordance with at least some embodiments.

FIG. 1 shows an overhead view of a marine survey system 100 in accordance with at least some embodiments. In particular, FIG. 1 shows survey vessels 102A and 102B having onboard equipment 104A and 104B, such as navigation, energy source control, data recording equipment and data processing equipment. Each survey vessel 102 is configured to tow one or more sensor streamers 106A-F through the water 150. While FIG. 1 illustratively shows each survey vessel 102 towing three sensor streamers 106, any number of sensor streamers 106 may be used. For example, each survey vessel 102 may tow five or more sensor streamers. In at least some embodiments, as shown in FIG. 1A, sensor streamers 106A-I may each be about 200 meters apart, and, in such embodiments, sensor streamers 106 may span 2000 meters (2 kilometers) or more as exemplified by spread 140. For ease of illustration, not all lines are shown in FIG. 1A.

The sensor streamers 106 are coupled to towing equipment that maintains the streamers 106 at selected depth and lateral positions with respect to each other and with respect to the respective survey vessel 102. The towing equipment may comprise two tow lines 108A and 108B each coupled to a respective one of survey vessels 102A and 102B by way of winches 110A and 1108, respectively. The winches enable changing the deployed length of each tow lines 108A and 108B. The second end of tow line 108A is coupled to a paravane 112A, and the second end of tow line 1088 is coupled to paravane 1128. (Paravanes may also be referred to as deflectors.) In each case, the tow lines 108A and 108B couple to their respective paravanes through respective sets of lines called a "bridle". Paravanes 112A and 112B either couple directly to spreader lines 120A, 120B, or as illustrated couple to the respective spreader lines by way of spur lines 122A and 122B.

A pulling line 128 is attached between tow lines 108A and 108B at point 111A and 111B, respectively. In at least some embodiments, attachment points 111B may be a mirror of attachment point 111A. Conversely, attachment point 111A is a mirror of attachment point 111B. Pulling line 128 may include two portions, 128A and 128B connected by a release device 130. In at least some embodiments release device 130 may be an acoustic release device which may be actuated by an acoustic signal from a survey vessel 102. However, other types of release devices also may be used. During a survey tow, tension may be maintained within pulling line 128 and tow lines 108A and 108B by the action of survey vessels 102A,B.

Release device 130 may be provided to allow the survey vessels to separate. For example, if sea or weather conditions arise whereby the survey vessels cannot control the speed or separation of the streamers, it may be prudent for the vessels to move apart. Similarly, if a survey vessel 102 encounters a hazard in the water, separation of the survey vessels may be necessary to allow the vessel to avoid the hazard. In such circumstances, the two portions, 128A and 128B of pulling line 128 may be separated by actuating release device 130. The parting of release device 130 permits the survey vessels 102 to move apart.

Upon separation of portions 128A and 128B, tension is no longer maintained in pulling line 128. In that case, paravanes 112A and 112B are each configured to provide a lateral force component to the various elements of the survey system in the absence of the lateral force otherwise provided by the tension in pulling line 128. In related art systems using a single survey vessel, paravanes similar to paravanes 112A and 112B may be symmetrically disposed at each side of the survey vessel. In such a configuration, the lateral forces of the paravanes provide the lateral forces that otherwise arise from the tension in pulling line 128 in marine survey system 100. However, in marine survey system 100 the active power at the outer perimeters of the spread as provided by the survey vessels 102 may help compensate for weather and sea currents. In turn, this may help increase the speed of completing the survey.

The sensor streamers 106 are each coupled, at the ends nearest their respective survey vessel 102 to a respective lead-in cable termination 124A-F. The lead-in cable terminations 124 are coupled to or are associated with the spreader lines 120, exemplified by spreader lined 120A-120F, so as to control the lateral positions of the streamers 106 with respect to each other and with respect to the vessel 102. Electrical and/or optical connections between the appropriate components in the onboard equipment 104, and the sensors 116 in the streamers 106 may be made using inner lead-in cables 126A-F. Much like the tow lines 108 associated with respective winches 110, each of the lead-in cables 126 may be deployed by a respective winch or similar spooling device such that the deployed length of each lead-in cable 126 can be changed.

In example embodiments, one or more sensor streamer 106A-F may be associated with a respective drag body 160A-F. Each drag body 160A-F may mechanically couple to the end furthest from the survey vessel (i.e. distal end) of its respective sensor streamer 106A-F, and may provide mechanical drag in the water to aid in keeping the sensor streamers in proper physical orientation.

In a seismic survey deployment, sensors 116 may include one or more instruments to detect acoustic seismic signals which may be generated by sources 132A, 132B. Sources 132 may comprise air guns, or a marine vibrator, or the like. Acoustic seismic signals are reflected by the sea floor and the geologic formations lying beneath, as described further in conjunction with FIG. 2, and detected by instruments comprising sensors 116. Such instruments may include a hydrophone sensitive to acoustic pressure fluctuations comprising the seismic signal, geophones sensitive to velocities of a fluid particle impinging on the hydrophone, and accelerometers sensitive the acceleration of a fluid particle impinging on the accelerometer. In a seismic survey, the accelerations of the fluid parcels may be induced by the acoustic seismic signal.

Figure 2:
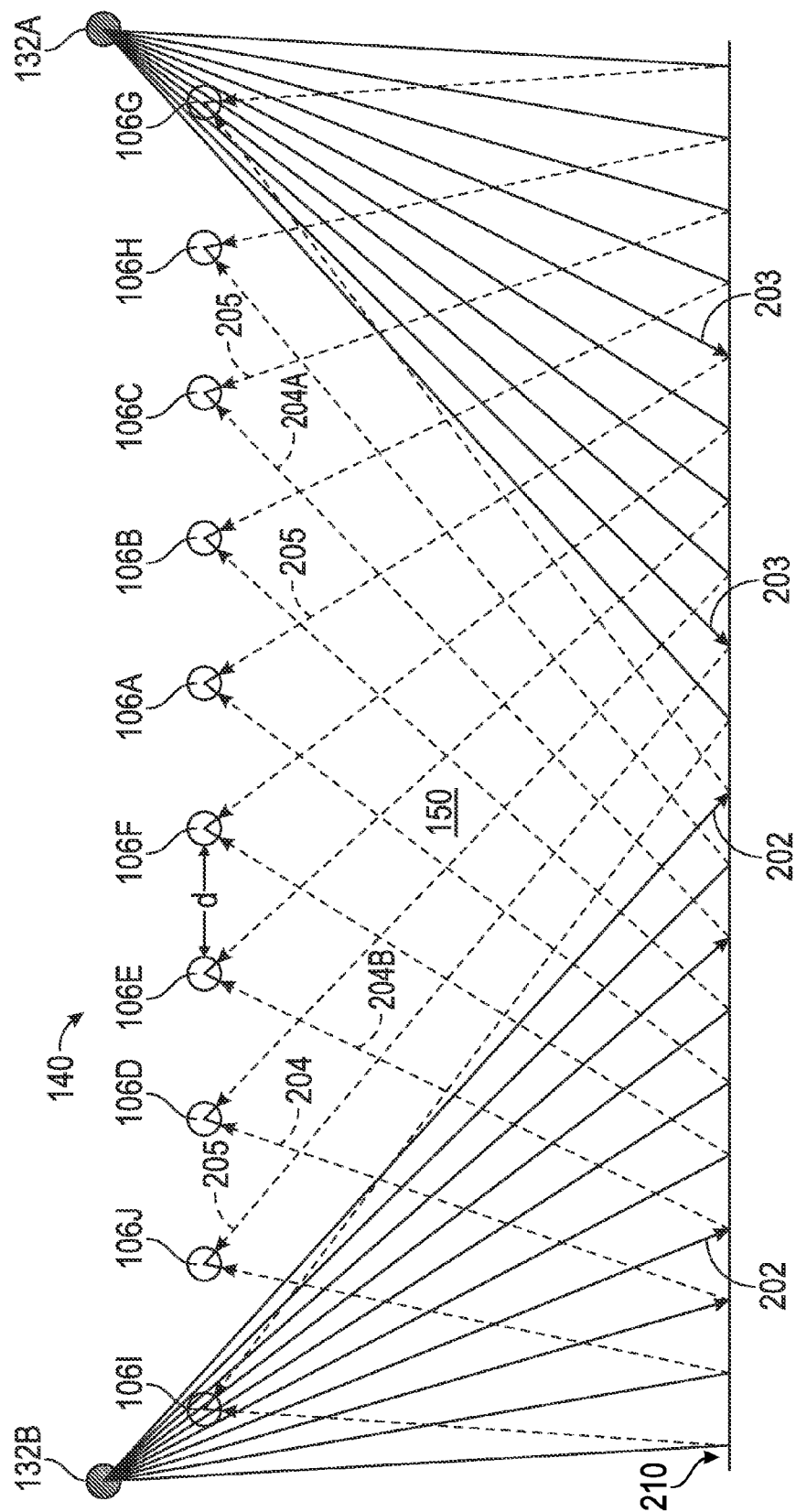
FIG. 2 shows a vertical section through a portion of marine survey system in accordance with at least some embodiments.

The path of acoustic seismic signals may be further appreciated by referring to FIG. 2 showing a vertical section through water 150 at the position of sensor streamers 106. Seismic acoustic signals are generated by sources 132A and 132B. In FIG. 2, seismic acoustic signals 202, 203, 204, and 205 are represented by lines, which lines may be understood as representing acoustic "rays" corresponding to an acoustic wavefield. Thus, seismic acoustic signals 202, 203, 204, and 205 may also be referred to as acoustic rays 202, 203, 204, and 205. Incident sound rays, shown as solid lines, are transmitted through water 150 and are reflected by sea floor 210 and the underlying subterranean formations (not shown in FIG. 2). The reflected acoustic rays are shown as dashed lines in FIG. 2. "Rightgoing" reflected acoustic rays 204 arise from incident acoustic rays 202 from source 132B, and are received at sensor streamers 106. The particular sensor streamer reached by a particular ray depends on the depth of the water 150 and the position reflection of the ray. Thus, rightgoing reflected ray 204A impinges on sensor streamer 106C at the right end of spread 140. Similarly, reflected ray 204B impinges on sensor streamer 106E near the mid-point of the spread 140. "Leftgoing" acoustic rays 203 from source 132A are similarly reflected from sea floor 210, e.g. reflected rays 205, and are received at sensor streamers 106 across spread 140. The sensor streamers may be a distance, d, apart. For example, in at least some embodiments, the distance d may be about 200 meters resulting in a width of spread 140 between sensor streamer 106I and 106C in the embodiment in FIG. 2 with ten sensor streamers of about 2000 meters. As described above, with the availability of active power at the perimeters of spread 140 represented by survey vessels 102 (not shown in FIG. 2), the width of spread 140 may not be constrained by the bounds on the lateral forces provided by the paravanes in related-art single vessel systems. Thus, in principle, the width of spread 140 may be made arbitrarily large, within the confines of the power available from the survey vessels 102, a minimum allowed speed of the inside sensor streamer when turning, and a maximum tension for the outside sensor streamer when turning. The availability of wide spreads in turn may help speed up a survey.

Figure 3:
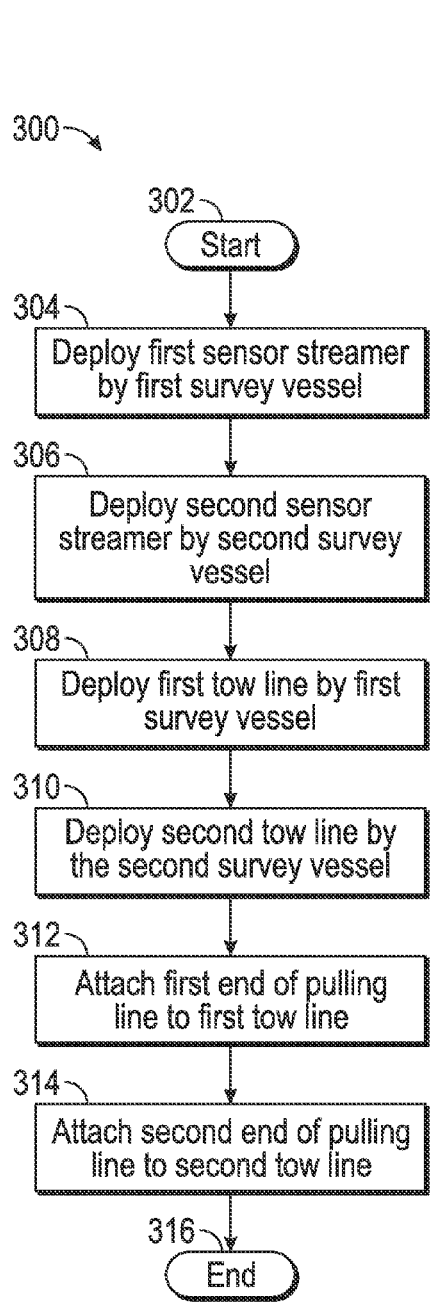
FIG. 3 shows a flow chart of a method in accordance with at least some embodiments.

FIG. 3 shows a flowchart of a seismic survey method 300 in accordance with at least some embodiments. Method 300 starts at block 302. In blocks 304 and 306, respectively, first and second sensor streamers are deployed by first and second survey vessels. The first sensor streamer may be deployed at a side of the first survey vessel facing the second survey vessel. Likewise, the second sensor streamer may be deployed at a side of the second survey vessel facing the first survey vessel. In deploying the first and second sensor streamers, the streamers may be deployed from the respective side of the survey vessel, or alternatively, in other embodiments, deployed from the stern of the respective survey vessel and positioned to the aforesaid side of the respective survey vessel. Further, during operation, the first sensor streamer may be positioned astern and to the aforesaid side of the first survey vessel. Likewise, during operation, the second sensor streamer may be positioned astern of and to the aforesaid side of the second survey vessel. In such embodiment, the disposition of the first and second sensor streamers may be similar to that of sensor streamers 106A and 106F, FIG. 1. In block 308, a first tow line is deployed by the first survey vessel. The first sensor streamer may be attached to the first tow line. Further, in at least some embodiments, the first sensor streamer may be attached to the first tow line by a spur line. In block 310, a second tow line is deployed by the second survey vessel. Similar to the first sensor streamer, the second sensor streamer may be attached to the second tow line. In particular, in some embodiments the attachment may be via a spur line similar to the attachment of the first sensor streamer and first tow line. In at least some embodiments, each of the first and second sensor streamers may be attached to its respective survey vessel by a corresponding lead-in cable. In block 312, a first end of a pulling line is attached to the first tow line. In block 314 a second end of the pulling line is attached to the second tow line, and in at least some embodiments, one or more additional sensor streamers are deployed with the survey vessels moving apart, maintaining tension in the pulling line, as spread of the sensor streamers increases in width. The attachment of the second end of the pulling line may be effected by transferring the second end of the pulling line from the first survey vessel to the second survey vessel by a transfer line established between the survey vessels and maintained under tension, and the pulling line attached at a mirror point of the attachment point of the first end. The transfer line may be established using a pneumatically-thrown messenger line launched between the survey vessels. The pulling line may, in some embodiments have two portions, one of which is attached to the first tow line and the other attached to the second tow line. The two portions may be joined by a release device. Further, the additional sensor streamers may be attached to spreader lines extending transverse to a direction of motion of the survey vessels. First and second seismic sources may be deployed from the first and second survey vessels, as shown, for example, in FIG. 1. At block 316, method 300 ends.

While FIG. 3 describes an order of events, the order of events may be modified and changed. For example, the paravane 112, tow line 108, spreader line 120, and sensor streamers 106 from each survey vessel may 102 may be fully deployed before the pulling line 128 is coupled between the tow lines 108 (the pulling line coupled, for example, by a separate work boat).

Figure 4:
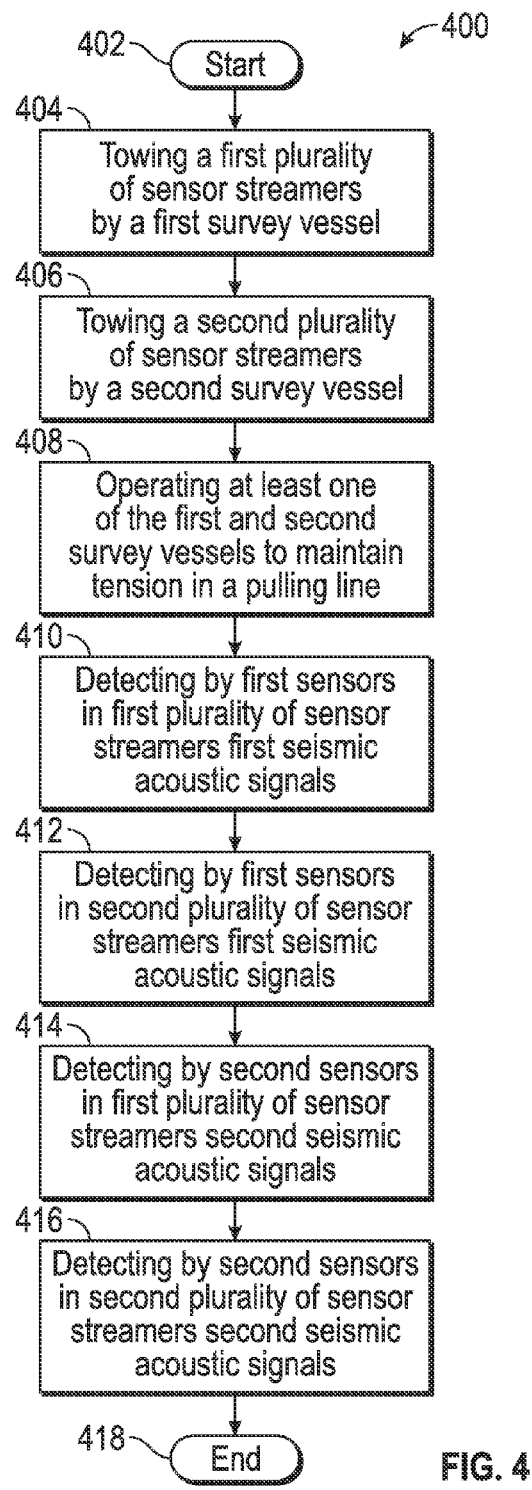
FIG. 4 shows a flowchart of a method in accordance with at least some other embodiments.

FIG. 4 shows a flowchart of a seismic survey method 400 in accordance with another embodiment. Method 400 starts at block 402. In block 404, a first plurality of sensor streamers, such as sensor streamers 106, FIG. 1, is towed by a first survey vessel. The first plurality of sensor streamers may be towed via a first tow line attached to the first survey vessel, as shown in the exemplary embodiment in FIG. 1. Likewise, a second plurality of sensor streamers is towed by a second survey vessel, block 406. The second plurality of sensor streamers may be towed via a second tow line attached to the second survey vessel. In block 408, at least one of the first and second survey vessels is operated to maintain tension in a pulling line that is connected between the first and second tow lines. One or more first sensors in the first plurality of sensor streamers detect first seismic acoustic signals reflected from a formation, at block 410. For example, referring to FIG. 2, the first sensors may be sensitive to "leftgoing" signals generated by source 132A and reflected from a formation (not shown in FIG. 2) beneath sea floor 210. Similarly, in block 412, one or more first sensors, e.g. sensors 116, FIG. 1, in the second plurality of sensor streamers detect first seismic acoustic signals reflected from the formation. In block 414, one or more second sensors in the first plurality of sensor streamers detect second seismic acoustic signals reflected from the formation. Again, referring to FIG. 2, second sensors may be sensitive to "rightgoing" signals generated by source 132B and reflected from the formation. One or more second sensors in the second plurality of sensor streamers detect second seismic acoustic signals reflected from the formation, at block 416. The detected first and second seismic acoustic signals may be communicated to the survey vessels. For example, the detected signals may be communicated via electrical and/or optical connections to onboard equipment 104 on the survey vessels, and stored thereon for later onshore analysis. Alternatively, the signals may be analyzed using data processing components in onboard equipment 104 to generate a geophysical data product indicative of a hydrocarbon reservoir within the formation. Method 400 ends at block 418.

References to "one embodiment", "an embodiment", "a particular embodiment", and "some embodiments" indicate that a particular element or characteristic is included in at least one embodiment of the invention. Although the phrases "in one embodiment", "an embodiment", "a particular embodiment", and "some embodiments" may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. For example, each sensor streamer 116 may comprise multiple individual sections electrically and mechanically coupled end-to-end to form each overall streamer 116. It is intended that the following claims be interpreted to embrace all such variations and modifications.

What is claimed is:

1. A system comprising:
   a first survey vessel;
   a first tow line coupled to the first survey vessel;
   a first sensor streamer coupled to the first tow line;
   a second survey vessel;
   a second tow line coupled to the second survey vessel;
   a second sensor streamer coupled to the second tow line; and
   a pulling line connected between the first tow line and the second tow line;
      wherein the pulling line comprises a first portion and a second portion, the first portion coupled to the first tow line at a first end of the pulling line and the second portion coupled to the second tow line at a second end of the pulling line; the first portion and the second portion having a release device disposed therebetween.

2. The system of claim 1 wherein:
   the first sensor streamer is coupled to the first survey vessel by a first lead-in cable; and
   the second sensor streamer is coupled to the second survey vessel by a second lead-in cable.

3. The system of claim 2 further comprising:
   a first spur line connected between the first tow line and the first sensor streamer; and
   a second spur line connected between the second tow line and the second sensor streamer.

4. The system of claim 1 wherein the release device comprises an acoustic release device.

5. The system of claim 2 further comprising:
   a third sensor streamer coupled to the first survey vessel by a third lead-in line and coupled to the first sensor streamer by a first spreader line; and a fourth sensor streamer coupled to the second survey vessel by a fourth lead-in line and to the second sensor streamer by a second spreader line.

6. A method comprising:
deploying a first sensor streamer by a first survey vessel, the first sensor streamer deployed at a side of the first survey vessel facing a second survey vessel;
deploying a second sensor streamer by the second survey vessel, the second sensor streamer deployed at a side of the second survey vessel facing the first survey vessel;
deploying, by the first survey vessel, a first tow line, the first tow line attached to the first sensor streamer;
deploying, by the second survey vessel, a second tow line, the second tow line attached to the second sensor streamer;
attaching a first end of a pulling line to the first tow line;
attaching a second end of the pulling line to the second tow line; and
prior to attaching the second end of the pulling line, transferring the second end of the pulling line from the first survey vessel to the second survey vessel.

7. The method of claim 6 wherein the first end of the pulling line is attached to the first tow line at a first point, and the second end of the pulling line is attached to the second tow line at a second point, the second point comprising a mirror point of the first point.

8. The method of claim 6 wherein the pulling line comprises a first portion attached to the first tow line at the first point and a second portion attached to the second tow line at the second point, the method further comprising joining the first portion of the pulling line and the second portion of the towing line with a release device deployed between the first and second portions of the towing line.

9. The method of claim 6 further comprising:
establishing a transfer line between the first survey vessel and the second survey vessel, wherein the transfer line is maintained under tension; and
wherein transferring the second end of the pulling line uses the transfer line.

10. The method of claim 9 further comprising launching a messenger line from the first survey vessel to the second survey vessel, wherein the transfer line is established using the messenger line.

11. The method of claim 6 further comprising:
increasing a distance between the first and second survey vessels; and
deploying one or more additional sensor streamers from each of the first and second survey vessels.

12. The method of claim 11, the one or more additional sensor streamers comprising a first and a second additional sensor streamer; and wherein:
the first additional sensor streamer is attached via a first spreader line to the first sensor streamer; and
the second additional sensor streamer is attached via a second spreader line to the second sensor streamer.

13. The method of claim 11 further comprising maintaining the pulling line under tension using active power provided by the first and second survey vessels.

14. The method of claim 12 wherein a first paravane is attached to the first towline and the first spreader line and a second paravane is attached to the second tow line and the second spreader line, the first paravane providing a lateral force on the first spreader line and the second paravane providing a lateral force on the second spreader line.

15. The method of claim 12 further comprising:
deploying a first seismic source by the first survey vessel;
deploying a second seismic source by the second survey vessel;
generating in a water body first seismic acoustic signals by the first seismic source and second seismic acoustic signals by the second seismic source; and
receiving, by sensors in the first, second and at least two additional sensor streamers, first and second seismic acoustic signals reflected from a formation disposed beneath a sea floor at a bottom of the water body.

16. A method comprising:
towing a first plurality of sensor streamers via a first tow line attached to a first survey vessel;
towing a second plurality of sensor streamers via a second tow line attached to a second survey vessel;
operating at least one of the first and second survey vessels to maintain a tension in a pulling line coupled between the first and second tow lines;
detecting, by one or more first sensors in the first plurality of sensor streamers, first seismic acoustic signals from a first source reflected from a formation beneath a sea floor;
detecting, by one or more first sensors in the second plurality of sensor streamers, the first seismic acoustic signals from the first source reflected from the formation beneath a sea floor;
detecting, by one or more second sensors in the first plurality of sensor streamers, second seismic acoustic signals from a second source reflected from the formation beneath the sea floor; and
detecting, by one or more second sensors in the second plurality of sensor streamers, second seismic acoustic signals from the second source reflected from the formation beneath the sea floor.

17. The method of claim 16 further comprising:
towing the first source by the first survey vessel; and
towing the second source by the second survey vessel.

18. The method of claim 16 further comprising:
communicating the detected first seismic acoustic signals from the first sensors in the first plurality of sensor streamers to onboard equipment on the first survey vessel;
communicating the detected first seismic acoustic signals from the first sensors in the second plurality of sensor streamers to onboard equipment on the second survey vessel;
communicating the detected second seismic acoustic signals from the second sensors in the first plurality of sensor streamers to onboard equipment on the first survey vessel;
communicating the detected second seismic acoustic signals from the second sensors in the second plurality of sensor streamers to onboard equipment on the second survey vessel; and
generating, from the detected first and second seismic acoustic signals, a geophysical data product indicative of a hydrocarbon reservoir in the formation, the generating by the onboard equipment on the first and second survey vessels.

19. The method of claim 18 wherein:
communicating the detected first and second seismic acoustic comprises communicating on at least one first connection between the first plurality of sensors and the onboard equipment on the first survey vessel, the first connection selected from at least one of:
a first optical connection; and
a first electronic connection; and communicating the detected first and second seismic acoustic comprises communicating on at least one second connection between the second plurality of sensors and the onboard equipment on the second survey vessel, the second connection selected from at least one of:

a second optical connection; and a second electronic connection.

* * * * *